UNITED STATES PATENT OFFICE.

JOSEPH H. AMIES, OF PHILADELPHIA, PENNSYLVANIA, ASSIGNOR OF ONE-HALF TO CHARLES FREMONT TAYLOR, OF SAME PLACE.

ASPHALT PAVEMENT.

SPECIFICATION forming part of Letters Patent No. 684,164, dated October 8, 1901.

Application filed February 14, 1901. Serial No. 47,206. (No specimens.)

*To all whom it may concern:*

Be it known that I, JOSEPH HAY AMIES, a citizen of the United States of America, and a resident of Philadelphia, county of Philadelphia, Pennsylvania, have invented certain new and useful Improvements in Asphalt Pavements, of which the following is a specification.

My invention has for its object the cheapening of the process of laying sheet-asphalt streets, with the further object of making said laying more convenient and with the still further object of extending the life of the said sheet-asphalt streets.

My process is as follows: I take sand or ground stone or slag, or all of them, and dampen the mass with naphtha, benzin, gasolene, headlight-oil, or any other suitable light oil, or I mix these with a heavier oil, such as residuum oil, for the purpose of procuring a stronger fuel element. When said mineral matter is thoroughly coated with the said oil, and in addition a sufficient quantity of the oil has been mixed with the same, (the quantity will vary according to the temperature and weather,) I ignite the gases emanating from the mass, which I turn over and over in order that the air may have free access thereto, or I may use a method of forcing air through the same in order to increase the heat by a larger consumption of oxygen. My object is to quickly and thoroughly heat the mineral matter to an intense degree. My process facilitates this, because the oil coats the grains of mineral matter, and if air is forced among said grains the blue flame created thereby, and which is very hot, will very rapidly heat the same. It is a much quicker and cheaper method than by radiation. Having thus quickly and cheaply heated the mass, I have at hand asphalt ground to a fine dust, which I sprinkle on the hot mineral matter and thoroughly mix therewith. The fine asphalt-dust is instantly melted by the heat of the hot minerals, and when they are thus and in due proportion coated with the asphalt I add a quantity of fluxing material, such as residuum or rosin oil, to render the pavement elastic, and mix this through the mass. I then add the right proportion of carbonate of lime and spread the composition upon the road-bed and roll it until all the said ingredients have been thoroughly incorporated, the heat remaining in the mass, assuring a positive and satisfactory result.

The above-described pavement composition is of course laid down upon a properly-prepared bed, such as is commonly used as the base for sheet-asphalt pavements. The said composition increases the endurance of asphalt-street wear. Grinding asphalt to a dust does not injure it, and when said granulated asphalt comes into contact with said hot granulated minerals it is instantly melted by a heat not intense enough to harm it or cause deterioration, besides it is subject to this heat but for a short time and under the conditions of being gradually cooled.

Having now described my invention, what I claim as new is—

The within-described process of making sheet-asphalt pavements, which consists in mixing granulated mineral matter with an inflammable oily composition, igniting the gases therefrom and causing the heat thereby generated to be thoroughly applied to said granulated mineral matter until same becomes heated to an intense degree, then mingling with the said hot mineral matter granulated asphalt, and blending both by stirring until the mass becomes plastic, then adding, while still hot, a fluxing agent and carbonate of lime, and then spreading the product upon the street and compacting and finishing the pavement by rolling and tamping in the usual manner, substantially as described.

Signed at Philadelphia this 13th day of February, 1901.

JOSEPH H. AMIES.

Witnesses:
JAS. W. ROBERTSON,
JAMES P. PETIT.